United States Patent

[11] 3,630,706

[72] Inventors Waldemar W. Oelke
　　　　　　Rossford;
　　　　　　Frank J. Carson; Alfred E. Badger, both of
　　　　　　Toledo, all of Ohio
[21] Appl. No. 714,114
[22] Filed Mar. 18, 1968
[45] Patented Dec. 28, 1971
[73] Assignee Libbey-Owens-Ford Company
　　　　　　Toledo, Ohio
　　　　　　Continuation of application Ser. No.
　　　　　　365,275, May 6, 1964, now abandoned.
　　　　　　This application Mar. 18, 1968, Ser. No.
　　　　　　714,114

[54] METHOD AND APPARATUS FOR BENDING AND TEMPERING GLASS SHEETS
　　　12 Claims, 18 Drawing Figs.
[52] U.S. Cl. .................................................. 65/104,
　　　65/106, 65/119, 65/182 A, 65/273, 65/289,
　　　65/350
[51] Int. Cl. .................................................. C03b 23/02,
　　　　　　　　　　　　　　　　　　　　　　　C03b 25/04
[50] Field of Search .......................................... 65/104,
　　　106, 114, 119, 182 A, 273, 275, 289, 349, 350,
　　　　　　　　　　　　　　　　　　　　　　　　351

[56] References Cited
UNITED STATES PATENTS
3,223,501　12/1965　Fredley et al. ................　65/25
3,341,312　10/1967　Wheeler et al. ...............　65/25
Primary Examiner—Arthur D. Kellogg
Attorney—Nobbe & Swope ABSTRACT: Bending and tempering glass sheets by first directing opposed flows of heated gases against a sheet to heat the glass and to support the sheet in a substantially vertical plane, then pressing the heated glass sheet between complemental shaping surfaces to the desired curvature, and finally directing opposed flows of cooling gases against the sheet to reduce its temperature and support it in the said plane.

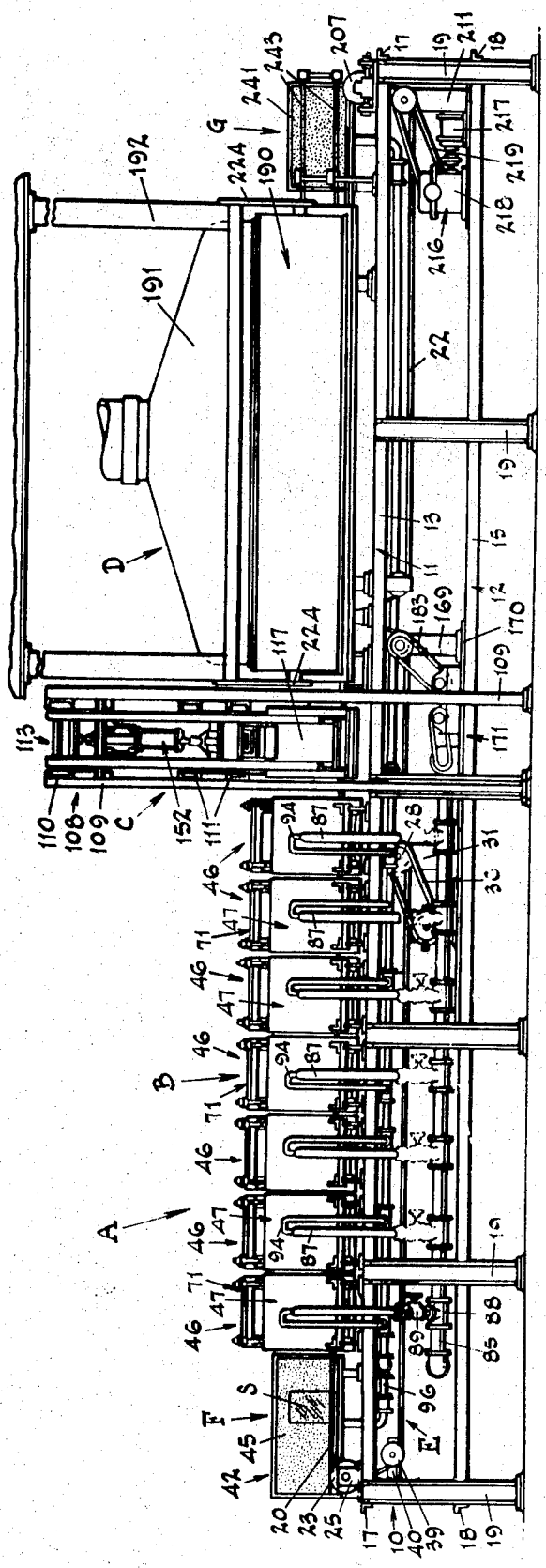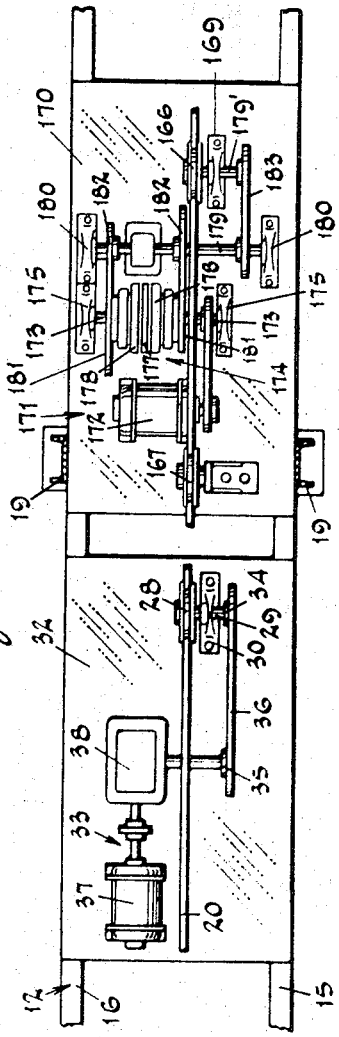

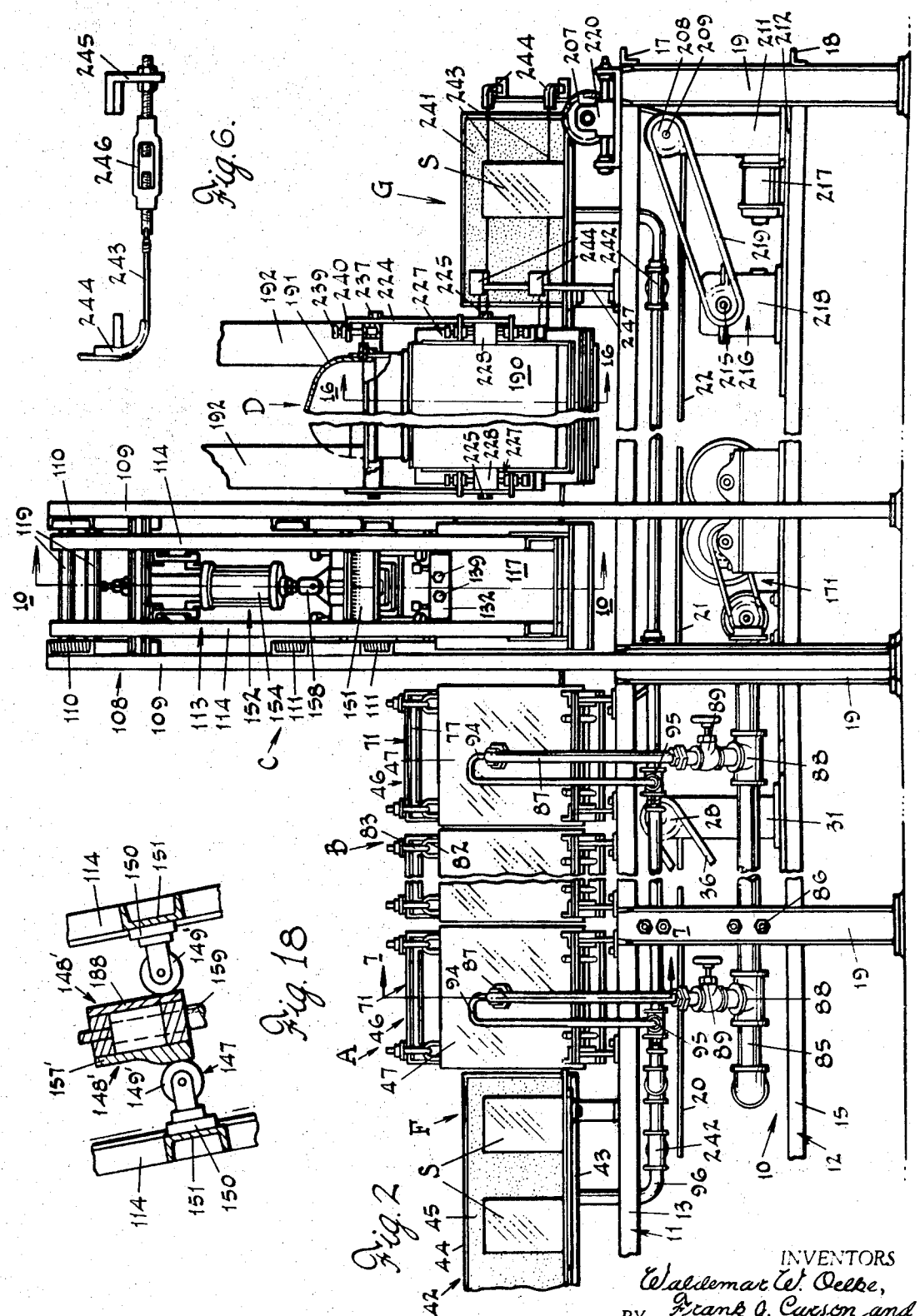

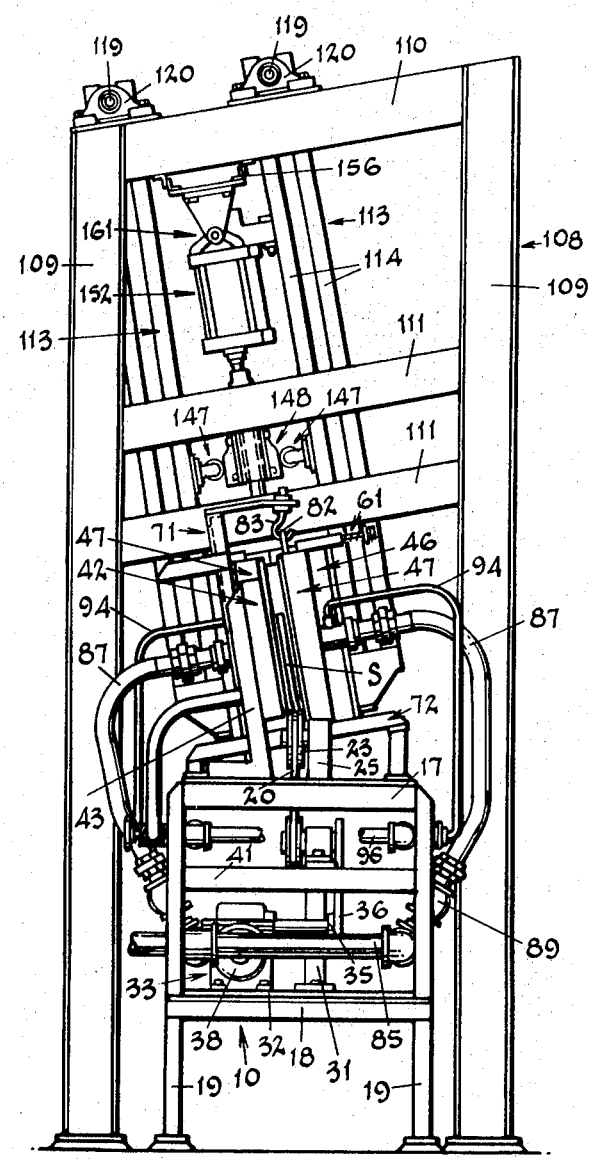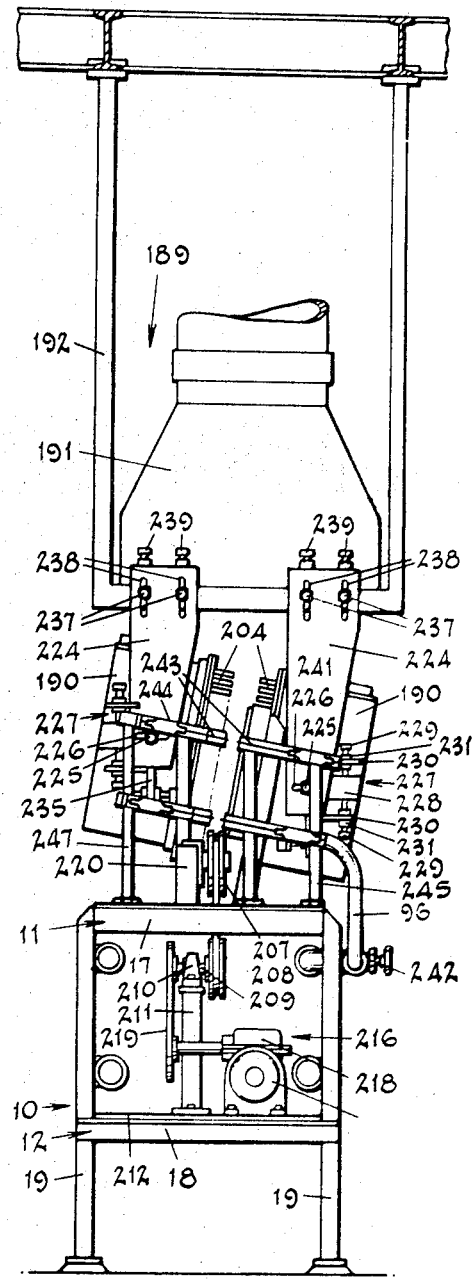
Fig. 3.
Fig. 4.
INVENTORS
Waldemar W. Oelke,
BY Frank J. Carson and
Alfred E. Badger
Nobbe & Swope
ATTORNEYS INVENTORS
Waldemar W. Oelke,
Frank J. Carson and
Alfred E. Badger
BY Nobbe & Swope
ATTORNEYS

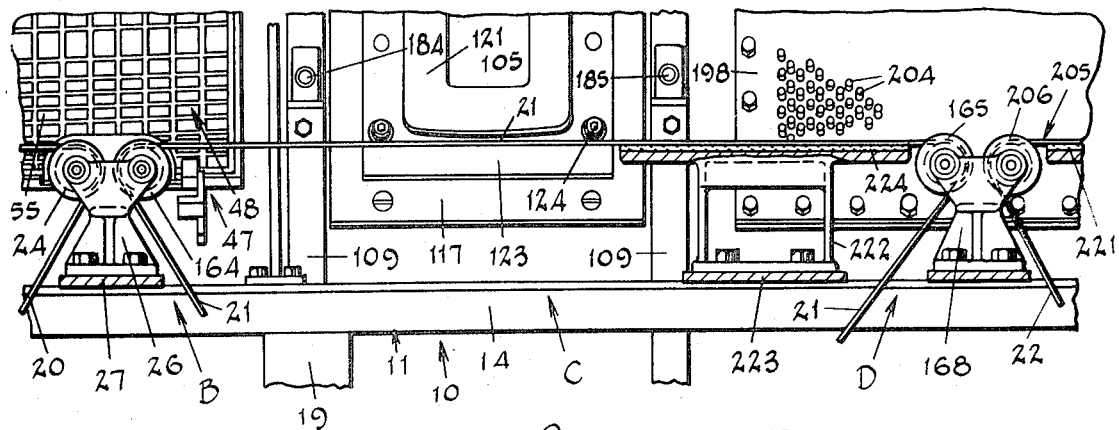
Fig. 11.
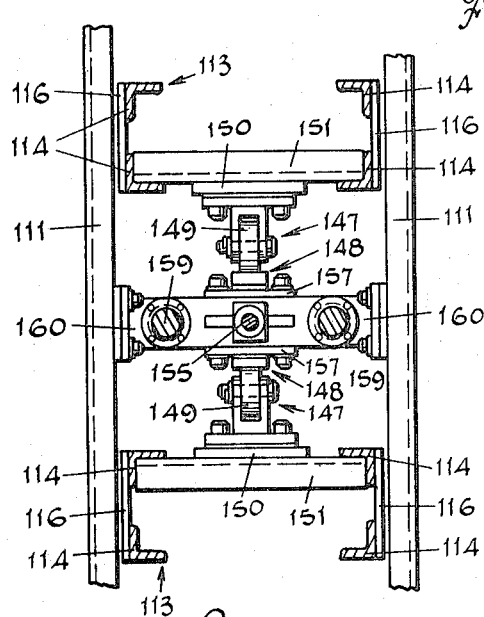
Fig. 12.
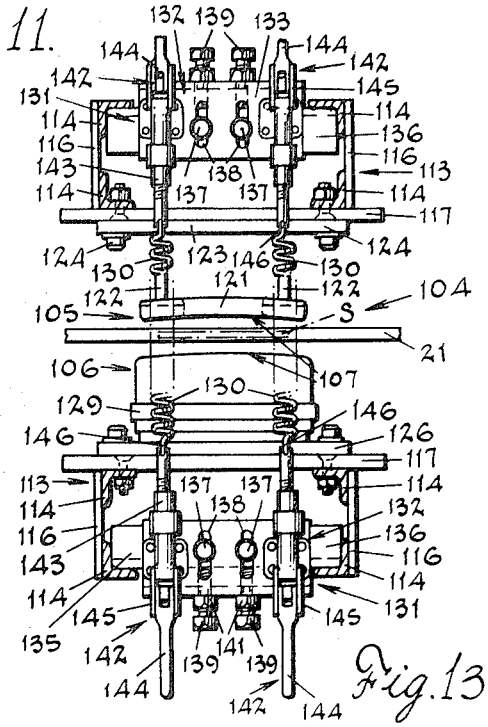
Fig. 13.
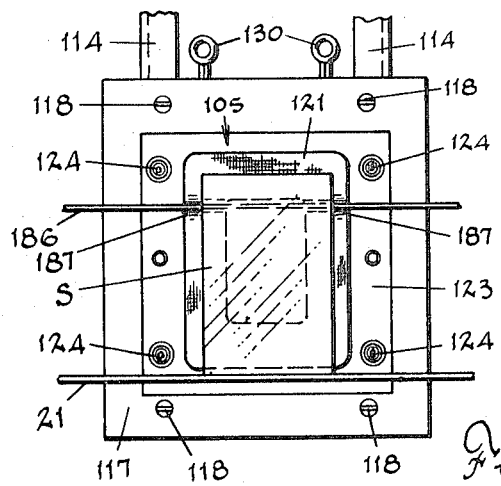
Fig. 14.
Fig. 15.
INVENTORS
Waldemar W. Oelke,
BY Frank J. Carson and
Alfred E. Badger
Nobbe & Swope
ATTORNEYS

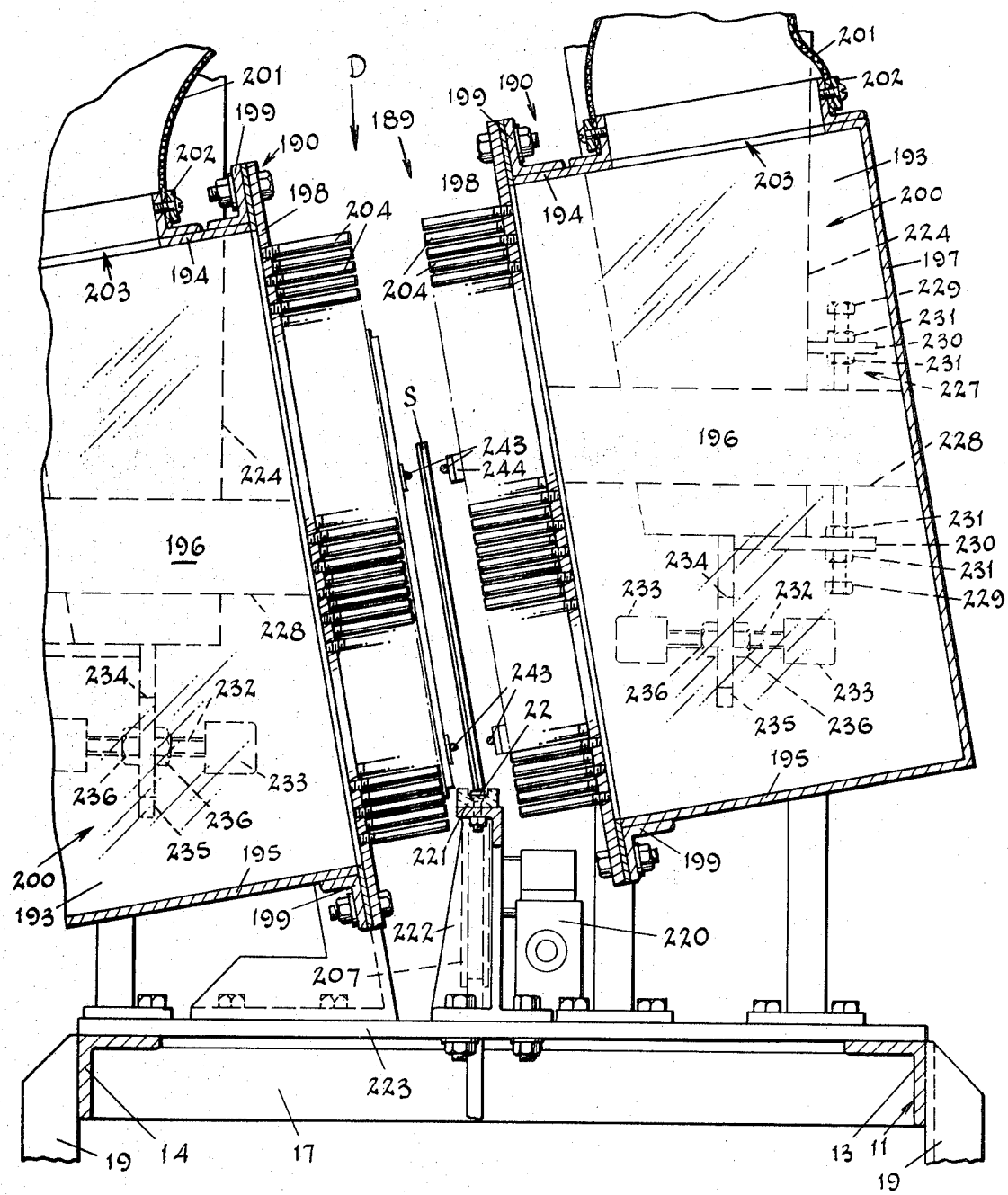
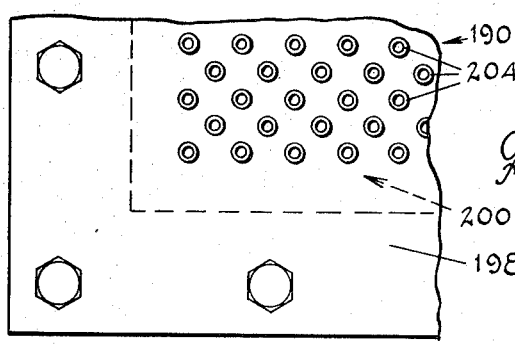
Fig. 16.
Fig. 17.

METHOD AND APPARATUS FOR BENDING AND TEMPERING GLASS SHEETS

This application is a continuation of application Ser. No. 365,275, now abandoned.

The present invention relates generally to the production of curved, tempered sheets of glass and more particularly to a new and improved method and apparatus for bending and tempering glass sheets.

Curved sheets of glass are widely used as glazing closures, particularly as windows for vehicles such as automobiles or the like. When used in this application, the glass sheets must be bent to rather precisely defined curvatures. In addition, the surfaces lying in the major areas of the sheets, that is, the surfaces comprising the viewing area of the window, must be free of any mars or defects which would interfere with clear vision through the window.

One known procedure for producing curved glazing closures of this type includes heating substantially flat sheets of glass to an elevated temperature at which the glass softens and thereafter pressing the heat-softened sheets between complemental interfitting shaping surfaces formed to the desired curvature of the finished sheets.

Glass sheets intended for use as vehicle windows are commonly heat treated or tempered to improve their strength and resistance to impact and to modify their breaking characteristics. These physical characteristics of glass depend upon the rate at which the temperature of the glass is reduced from an elevated temperature corresponding to the softening point of glass to a temperature below the annealing range of glass. As is well know, when a body of glass is rapidly cooled through this range, the outermost surfaces or "skin" of the glass body is placed under compressive stress thereby increasing the impact resistance and improving the breaking characteristics of the body of glass.

The primary object of the present invention is to provide an improved method and apparatus for producing curved sheets of glass of the above character on a commercial or mass production basis without adversely affecting the quality of the finished sheets.

Another object is to bend and temper the sheets as the latter are moved successively, one by one, along a predetermined path.

Another object is to accomplish the foregoing with a minimum of physical contact with the major surfaces of the sheet and thus with a minimum of marring of the surfaces.

A more detailed object is to support the sheets for movement along said path on cushions of air thereby avoiding physical contact between the sheets and the apparatus.

Other objects and advantages of the invention will become more apparent during the course of the following description when taken in connection with the accompanying drawings. In the drawings, wherein like numerals are employed to designate like parts throughout the same:

FIG. 1 is a side elevation of the glass-treating apparatus;

FIG. 2 is an enlarged, fragmentary side elevation of the apparatus;

FIG. 3 is a view of the entry end of the apparatus;

FIG. 4 is a view of the exit end of the apparatus;

FIG. 5 is a fragmentary plan view of the conveyor;

FIG. 6 is a detail view of a glass sheet support means;

FIG. 11 is a detail view of the conveyor passing through the pressing section;

FIG. 12 is a detail sectional view taken on line 12—12 of FIG. 10;

FIG. 13 is a similar detail view taken on line 13—13 of FIG. 10;

FIG. 14 is a plan view of one member of the pressing mold;

FIG. 15 is a horizontal sectional view of the mold members in the closed position;

FIG. 16 is a vertical transverse of the tempering section and taken on line 16—16 of FIG. 2;

FIG. 17 is a fragmentary plan view of the tempering section; and

FIG. 18 is a vertical section of a modified manner of operating the pressing mold member.

Figure 7:
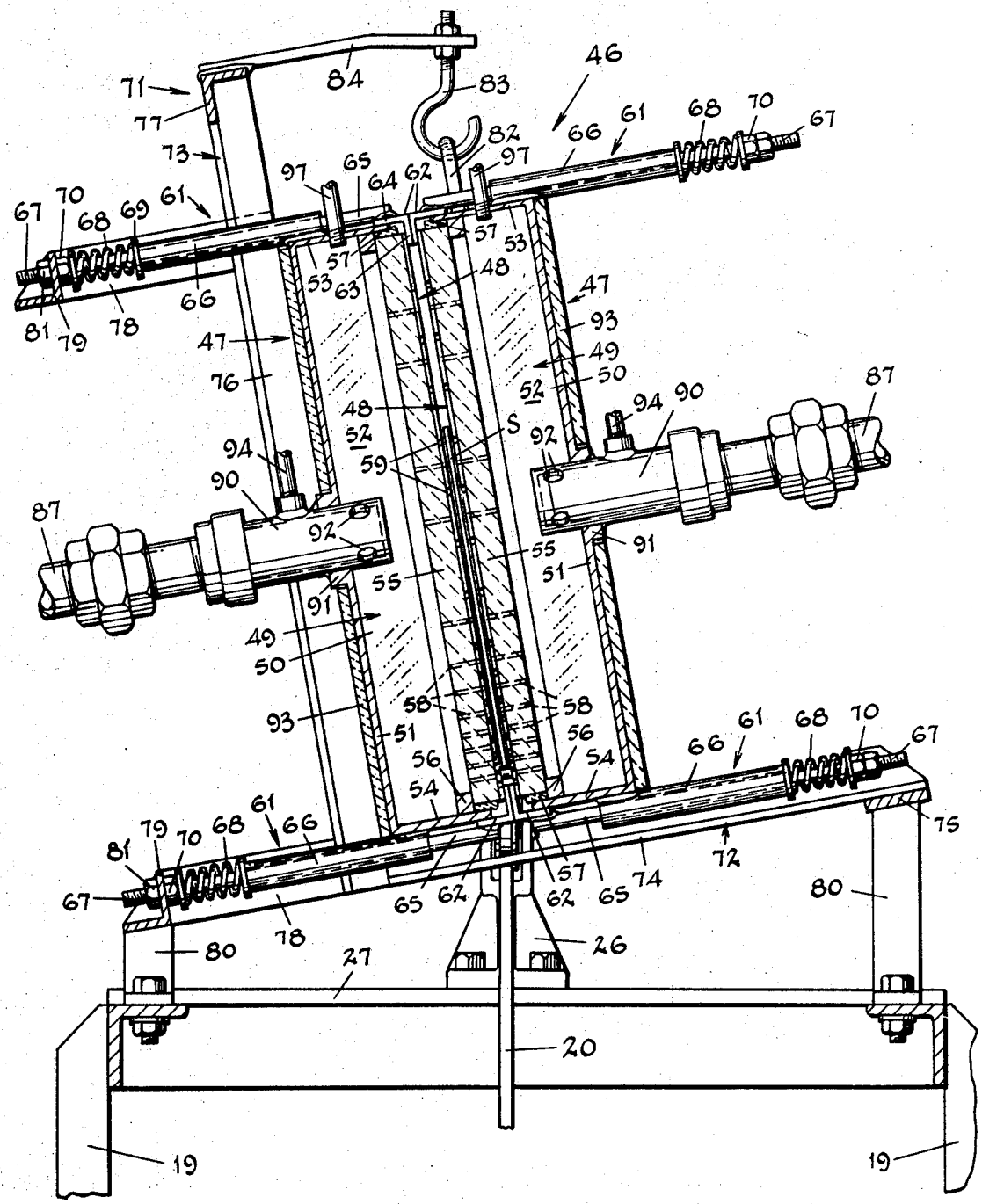
FIG. 7 is a vertical transverse section of the heating section of the apparatus taken on line 7—7 of FIG. 2.

In the commercial production of bent and tempered glass sheets in relatively large quantities, the sheets are heated, bent and tempered in a substantially continuous procedure. To this end, the sheets are carried successively, one by one, along a predetermined path through a heating area, a bending area and a cooling or tempering area, which area are contiguous so that each sheet, upon being moved through one area, passes immediately into and through the following area. In this manner, the heat imparted to the sheet to bring it to the bending temperature is utilized in the tempering process.

In the drawings, for purposes of illustration, the present invention is shown embodied in an apparatus for bending and tempering glass sheets by a continuous commercial process similar to that described above. The overall apparatus, designated generally by the letter A, is divided into a heating section B in which the glass sheets S are heated to a temperature corresponding to the softening point of glass, a bending section C in which the sheets are formed to the desired curvature and a tempering section D in which the curved sheets are chilled from the elevated bending temperature to a temperature below the annealing range of glass. The several sections A, B, and C are mounted in aligned relationship along a predetermined path defined by a conveyor system E which carries the sheets along the apparatus and through each of the sections successively from a loading area F at one end of the path to a discharge area G at the opposite end of the path.

The various sections making up the apparatus A and the conveyor system E are carried by a frame 10 formed by horizontally disposed upper and lower frame members 11 and 12, each comprising two side support rails 13, 14, 15, and 16 extending longitudinally along the path at opposite sides thereof and end rails 17 and 18 extending transversely across the path at opposite ends of the apparatus thereby to form two rectangular members. The members 11 and 12 are disposed one above the other and supported by vertically disposed pedestals 19.

As mentioned above, when curved glass sheets are intended for use as glazing closures, any mars, scratches, or other defects in the surfaces of the glass sheets lying within the viewing area of the finished window render the sheets commercially unacceptable. Thus, care must be exercised to protect these areas from any physical abuse which could scuff or mar the surfaces of the sheet, particularly those surfaces lying within the critical areas. The problem of so protecting the sheets becomes more aggravated when the sheets are heated to the elevated bending temperature and thus are in a heat-softened condition.

In accordance with the present invention, the critical areas of the sheets are protected by avoiding physical contact with these areas throughout the bending and tempering operation or, at least, maintaining any contact at a minimum. To this end, the invention contemplates supporting the sheets on a cushion of air as they are moved through at least certain sections of the apparatus. More particularly, a cushion of air is provided on which the sheets rest as they are carried along the predetermined path by the conveyor system E which contacts only the edge or noncritical portions of the sheets.

Herein, the sheets are carried on a conveyor comprising a relatively narrow band of somewhat flexible material such as stainless steel tape or the like driven endwise along the predetermined path from the loading area F through the heating section B, bending section C and the tempering section D to the discharge area G. In order that the sheets may be moved through each of the individual sections at a speed commensurate with the operation to be performed on the sheet in that section, herein, the conveyor system E consists of a plurality of individual tapes, three in the present instance and identified by numerals 20, 21 and 22, disposed in aligned, end-to-end relationship along the path and each adapted to be driven independently of the others.

The band 20, adapted to carry the sheets to be bent from the entrance end of the loading area F to the exit end of the heating section B, forms a closed loop defined by a plurality of sheaves including two guide sheaves 23 and 24 aligned with the path and adapted to support a horizontal run of the band extending along the path. The sheave 23 is journaled adjacent the entrance end of the loading area F on a bearing bracket 25 mounted on the end rail 17 of the frame member 11. The other guide sheave 24 is journaled adjacent the exit end of the heating section B on a double-bearing bracket 26 carried by a plate 27 extending transversely across the path between the side rails 13 and 14 of the upper frame member 11.

The guide sheaves 23 and 24 are rotatable about parallel axes lying in a common plane with their outer peripheries tangent to the plane of the path to support the horizontal run of the band extending along the path. As the band 20 is driven endwise around the loop, the glass sheets are advanced along the horizontal run from the loading area F through the heating section B. The band is driven endwise around the loop by a drive sheave 28 fixed to a shaft 29 journaled in a bearing 30 supported on a pedestal 31 upstanding from a plate 32 extending between and fixed to side rails 15 and 16 of the lower frame member 12. The shaft 29 is rotated about an axis extending transversely across the path and disposed below the path adjacent the exit end of the heating section B.

The shaft 29 is coupled to a power source 33 through the medium of sprockets 34 and 35 mounted on the shaft 29 and the output shaft of the power source respectively and joined by a chain belt 36 extending therebetween. The power source 33 includes a motor 37 and a speed-reducing unit 38 mounted below the path adjacent the exit end of the heating section B on the plate 32. The speed at which the band 20 is driven is governed by the speed-reducing unit 38 which is selected to move the band 20 and the sheets carried thereby through the heating section B at a speed commensurate with the length of time needed to ensure that the sheets will be heated to the desired temperature in their passage through the heating section.

The loop defined by the band 20 is completed by an idler sheave 39 disposed in the loading area F below the guide sheave 23. The idler sheave 39 is journaled on an adjustable bearing member 40 supported by a brace 41 fixed to the pedestals 19 and is movable toward and away from the center of the loop defined by the band to selectively increase or decrease the length of the path traversed by the band thereby to control the tension of the band.

The sheets S rest on one edge on the band 20 and are balanced, as it were, in this position by a cushion of air as they move through the loading area F and the heating section B. Thus, in keeping with the aims of the invention, physical contact between the major surfaces of the sheets and the conveyor or the heating apparatus is completely eliminated.

In the illustrated embodiment, the sheets are supported, with one edge resting on the band 20, in a plane forming an angle of approximately 10° with the vertical plane passing through the path.

The means providing the cushion of air in the loading area F comprises an air flotation unit 42 carried by a plate 43 upstanding from the side rails 13 and 14 of the upper frame member 11. This air flotation unit 42 comprises a pan 44 inclined upwardly from the path and opening toward the path. A panel 45 is received in the open side of the pan 44. The pan is coupled to a source of air under pressure by means to be hereinafter more fully described. The panel is either provided with apertures or is formed of an air pervious material permitting the pressurized air to flow outwardly through the panel and impinge on the surface of the glass sheets moving thereby thus forming an air cushion to float the sheets in a desired plane as they are advanced through the loading area.

HEATING SECTION

The sheets S are floated on a similar cushion of air as they are moved through the heating section B of the apparatus. In accordance with another aspect of the invention, the cushion of air supporting the glass sheets in the heating section is utilized to heat the sheets to bring them to the proper bending temperature. To this end, means are provided adjacent the path in the heating section to direct heated gases or air against the sheet to float the sheet and at the same time to elevate its temperature.

As best shown in FIG. 1, the cushion of heated air in the heating section B is provided by a plurality of heating units 46 disposed side by side along the path. The utilization of a number of separate heating units 46, seven in the illustrated embodiment, which units may be individually controlled, enables the heat at various locations along the path to be regulated whereby the temperature of the sheet S may be brought to the bending temperature in a variety of ways, it usually being desired to raise the temperature of the sheet passing through the heating section gradually and progressively from the entrance end to the exit end of the section.

It will be appreciated that when the sheets are disposed in an inclined plane as illustrated in the drawings, a cushion of air is necessary only adjacent one side of the sheet; the force of gravity against the sheet being sufficient to maintain the sheet in the desired plane. It is within the contemplation of the invention that an apparatus providing but a single cushion of heated air adjacent one side of the sheet be utilized. In order to heat the sheet more efficiently in a relatively shorter period of time, however, in the present instance, heated air or gas is directed against both major surfaces of the sheet as they are moved through the heating section. This heated air or gas is directed against the sheets at controlled balanced pressures so that the sheet moves through the heating section between opposed air cushions which maintain the sheet in the desired plane.

Each of the heating units 46 comprises two similarly constructed heating members 47 having opposed parallel planar surfaces 48 disposed at opposite sides of the path. The heated air is directed through the opposed planar surfaces or working faces 48 of the heating chambers 47 to impinge on the surfaces of a glass sheet S moving therebetween thereby to form an air cushion between the surfaces of the glass sheets and the working faces of the heating chamber.

The heating members 47 of each heating unit 46 are similar in construction and include an enclosed chamber 49 defined by an open-face pan 50 or box having a rear wall 51, sidewalls 52, top wall 53 and bottom wall 54 with the open face of the pan closed by a panel 55 received therein and seated against a flange 56 fixed to the inner surfaces of the side, top and bottom walls of the pan and projecting inwardly therefrom. As shown in FIG. 7, the heating members 47 forming each heating unit 46 are positioned on opposite sides of the path with the panels 55 being opposed to each other and lying in planes parallel to the plane in which the sheet is supported.

The planar surfaces or working faces 48 are formed on the outer surface of each of the panels 55 of each unit and the heated air is directed through the panels 55 to form a cushion between the glass sheet and the working face 48. The panels are formed from a heat-resistant material such as a refractory material. A suitable material for this use is sold under the trademark "Masrock" by Glasrock Products, Inc. which is composed of 99.8 percent fused silica. The panels 55 are slightly thicker than the spacing between the outer edge of the pan walls and the flange to ensure that the pans do not interfere with the formation of the cushion of air. To compensate for relative expansion between the panel 55 and the pan 50, which is made from a different material, usually metal, the panel is slightly smaller in dimension than the pan and a heat-resistant packing material 57 is interposed between the peripheral edges of the panel and the inner surfaces of the walls of the pan. The packing 57 also serves to pressure seal the heating chambers 47.

Figure 8:
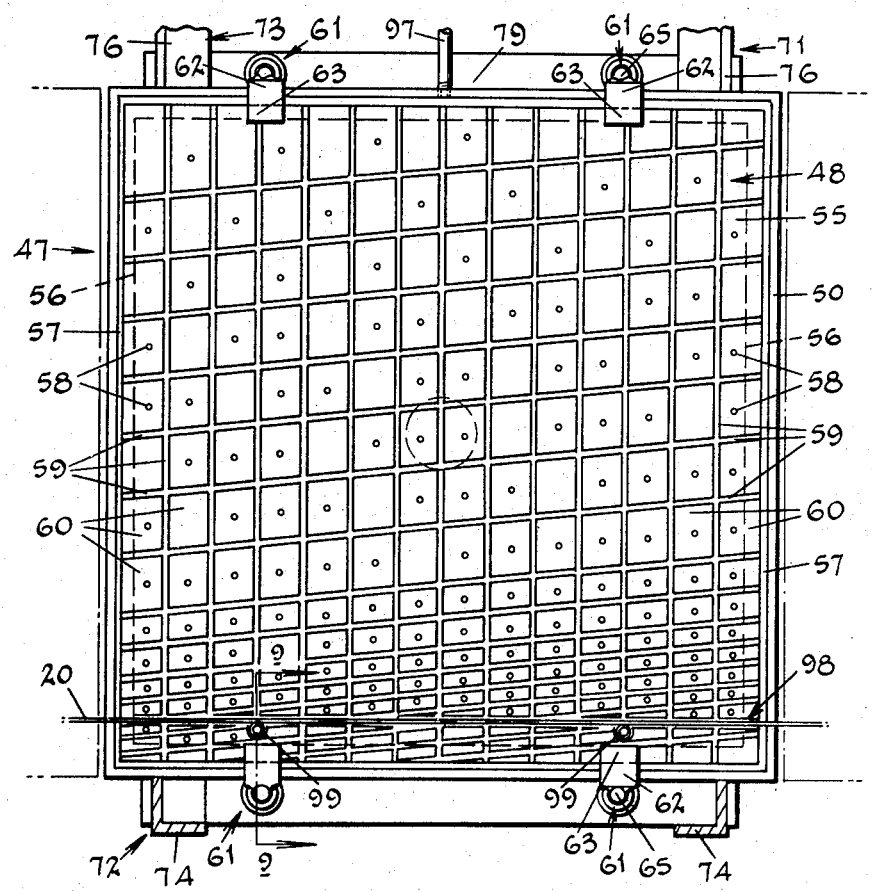
FIG. 8 is an elevation of one heating unit.
Figure 9:
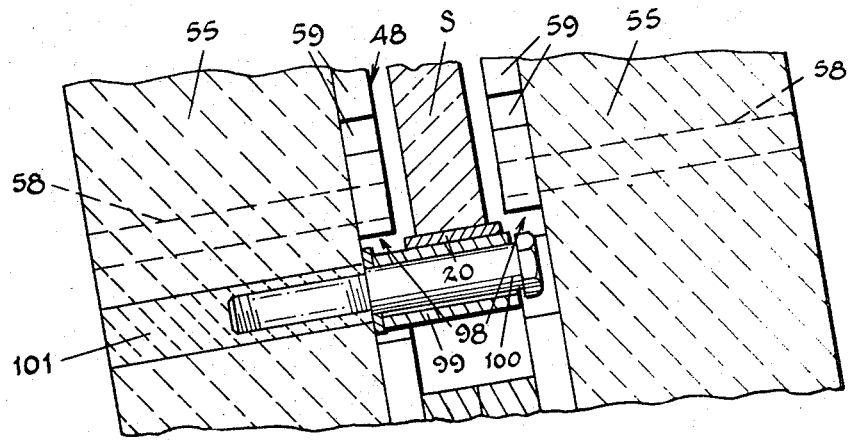
FIG. 9 is a vertical transverse section taken on line 9—9 of FIG. 8.

In operation, highly heated gases pass from the chamber 49 through ports 58 formed in the panels and extending between the chamber and the working face 48 of the panel. As best shown in FIG. 8, the ports 58 are distributed across the panel in a pattern designed to effect the desired heating and air flotation. While the invention is not limited to any particular pattern or arrangement of the ports across the panel, preferably, as shown in FIG. 8, the number of ports increases, and the spacing between the ports decreases, in the lowermost regions of the panel. It has been found that such an arrangement, due to the natural currents of the highly heated gases emerging from the ports, results in an equal overall distribution of the heated air.

As shown in FIG. 8, the ports 58 in the present instance are arranged in a series of substantially vertical columns equally spaced apart across the panel. In order to prevent the hot gases from impinging upon the sheet in horizontal lines, the ports of adjacent columns are slightly offset from each other to form a series of unequally spaced-apart inclined rows of ports extending across the panel.

To further aid in evenly heating the glass sheets, means are provided to facilitate the flow of the heated air, emerging from the ports, across the surface of the sheet. For this purpose, each of the ports 58 are surrounded by outwardly opening exhaust grooves 59 formed in the working face 48 of the panel. With the illustrated arrangement, a number of substantially parallel and equally spaced vertical grooves are provided between each of the columns of ports 58 and a series of inclined grooves separate each of the inclined rows of ports. The grooves 59 divide the working face into a plurality of plateaus 60. The ports are formed through the center of certain of these plateaus and equally spaced from the grooves forming the individual plateaus.

The panel 55 of each member 47 is attached to the pan 44 by a clamping means 61 acting between the pan and the working face 48 of the panel to resiliently urge the latter into seating engagement with the flange and being operable to yield in response to expansion and contraction of the panel. Four such clamping means 61 are utilized in the present instance; two each on the upper and lower sides of the unit. Each of the clamping means 61 includes an L-shaped retaining member 62 having one leg 63 extending along the working face 48 of the panel 55 and the other leg 64 extending away from the path along the top or bottom wall of the pan 44. A rod 65 extending outwardly away from the path is fixed at one end to the leg 64 of the retention member and projects through an elongated sleeve 66 secured to the upper or lower wall of the pan with a threaded extension 67 extending beyond the outer end of the sleeve. A coil spring 68 telescoped on the extension 67 of the rod 65 acts between the outer end of the sleeve 66 and a washer 69 fixed on the rod by a locknut 70 threaded on the extension 67. The spring 68 urges the rod 65 outwardly relative to sleeve 66 to clamp the leg 63 of the retention member against the working face 48 of the panel 55. The pressure exerted by the leg 63 against the working face 48 is regulated by threading the locknut 70 back and forth along the rod thereby to compress or release the coil spring.

The heating units 46 are supported side by side in the heating section B on the frame 10 by supports 71 having a base 72 and an inverted U-shaped rack 73 extending upwardly therefrom in a plane parallel to the plane of the pans 44 adjacent one side of the path. In the illustrated embodiment, the base 72 is inclined from the horizontal plane passing through the path and disposed in a plane parallel to the plane of the bottom walls of the pans. The base 72 is formed by parallel angle members 74 spaced apart a distance less than the width of the pans 50 and extending from the rack 73 perpendicularly across the path and joined at their outer ends by a longitudinally extending bar 75.

The inverted U-shaped rack 73 comprises angle members 76 attached to the opposite ends of the members 74 and joined at their upper ends by an angle 77 extending longitudinally of the path. Support bars 78 project laterally outwardly away from the path at the lower end of the rack 73 and at a position intermediate at the ends of the members 76 adjacent the top wall 53 of the pan. The outer ends of the bars 78 are joined by angular braces 79. The support 71 is mounted on the side rails 13 and 14 of the upper frame member 11 through the medium of legs 80 extending between the outer ends of the angle members 74 and the bars 75. The heating member 47 at one side of the path, the lowermost member in the illustrated embodiment, rests against the rack 73 with the bottom wall 54 of the pan resting against the base 72 and is secured to the rack 73 by means of the clamping means 61 attaching the panel 55 to the pan 50. To this end, the threaded extension 67 on the rods 65 project through holes bored in the braces 79 with the locknut 70 bearing against one side of the brace and an additional locknut 81 threaded on the rod and bearing against the opposite side of the brace.

To enable the heating members 47 of each unit 46 to be easily separated to permit inspection of the working faces 48 of the panels 55 and to clear the apparatus should a glass sheet become broken between the panels, the heating member 47 on the opposite side of the path from the rack 73 is not secured directly to the supports 71 but rather merely rests on the members 74 of the base 72 at their lower ends and are suspended from the support at their upper ends so as to permit the members 47 to be rocked about their upper ends away from the opposite member or to be completely removed from the apparatus by detaching the upper ends. To this end, the members 47 at one side of the path are provided with eye members 82 attached to the top wall 53 of the pan 50 and adapted to receive a hook 83 depending from bars 84 secured at one end to the rack 73 and projecting outwardly across the path.

In the illustrated embodiment, the panel 55 on the uppermost member 47 rests against the panel on the lowermost heating member and means are provided between two working faces 48 to maintain the members in spaced relation to provide a gap through which the sheet passes. The spacing between the working faces 48 of the panels 55 may vary according to the heating characteristics of the various units and according to the thickness of the glass sheets to be heated. By way of example, when treating ¼-inch glass sheets, a spacing between the opposed working faces three-eighths inch has proved satisfactory. With this spacing, an air cushion one-sixteenth inch in thickness is created between each surface of the sheet and the adjacent working face of the panel.

Herein, the means separating the opposed working faces 48 comprise the legs 63 of the L-shaped retention members 62 which abut each other when the heating members are in their assembled operative positions. Thus the spacing between the panels may be varied by varying the thickness of the legs on at least one of the retention members.

Combustible gases are brought to the heating section from a source (not shown) by a supply pipe 85 extending along opposite sides of the apparatus A and supported on the pedestals 19 of the frame 10 by "U"-bolts 86. The chambers 49 in each of the heating members 47 are coupled to the supply pipe 85 through the medium of conduits 87 extending between the chamber and a "tee" 88 on the supply pipe. The flow of combustible gas into each chamber 49 is regulated by a valve 89 in the conduit. The chamber end of each conduit 87 is coupled to a burner tube 90 projecting through a boss 91 formed on the rear wall 51 of the pan 50 and into the chamber with the inner end of the tube being closed. The burner tube 90 is provided with a plurality of ports 92 circumferentially spaced apart around the tube and through which flames radiate outwardly from the tube into the chamber. The flames emitting from the burner tube 90 heat the air and gases in the chamber 49 and this highly heated air flows outwardly through the ports 58 in the panel 55 to heat the glass sheets and provide the desired cushion of air. To retard the escape of heat rearwardly of the heating member 47, a layer of insulating material 93 such as glass cloth, asbestos or the like is provided on the outer surface of the rear wall 51 of the pan 50.

The pressure of the hot gases within each chamber 49 is controlled by introducing air under pressure into the chamber through the burner tube 90. The pressurized air is introduced into each burner tube through a pipe 94 having one end threaded into the burner tube and the opposite end connected through a valve 95 to a supply pipe 96 carried by the frame and extending longitudinally along the path. The amount of hot air escaping through the ports of the panels to create the air cushion by which the glass sheets are more or less freely supported between the panels depends upon the pressure maintained in the chamber, which pressure is controlled by introduction of pressurized air into the chamber and this, in turn, is regulated by the valve 95.

To aid in maintaining the constant pressure at the desired magnitude within each heating chamber, a pressure-measuring device (not shown) such as a manometer may be connected to each chamber through a tube 97 projecting through the top wall 53 of each pan 50. If desired, readings of the temperature within the chamber may be obtained by introducing a thermocouple into the chamber 49 through the top wall.

As described above, the sheets are carried through the heating section B and between the panels 55 by the band 20. To accommodate movement of the horizontal run of the band 20, the surface 48 of each panel is provided with a substantially horizontally disposed outwardly opening groove 98 which together form a slot to receive the band.

To aid in supporting the glass sheets S and to minimize sagging of the band 20 due to the weight of the sheets, means are provided along the path to carry the band. In the heating section B this means comprises rotatable sleeves 99 journaled on bolts 100 secured as by a suitable cement 101 in one of the panels 55 and projecting outwardly therefrom across the path. Both the sleeve 99 and bolt 100 are usually made of stainless steel to withstand the relatively high temperatures to which they are subjected. The sleeves 99 are spaced apart along the path to provide uniform support for the glass sheets in the plane of the path, the number and spacing of the sleeves being governed by the size and weight of the sheets. Support for the undersurface of the band 20 in the loading area F is provided by a support channel 102 in which the band rides. The channel 102 is formed from a refractory material such as Marinite or the like and is carried by a bracket 103 fixed to the plate 27.

BENDING SECTION

Upon emerging from the heating section B, the heated sheets are advanced into the bending section C and shaped to the desired curvature. In the present instance, a bending means 104 of the pressing type is utilized to perform this function. Generally, this means 104 includes two mold parts 105 and 106 disposed on opposite sides of the path and mounted to move relative to one another toward and away from the path, thereby to press the glass sheet disposed on the path between complemental interfitting shaping surfaces 107 formed on the mold parts. The mold parts 105 and 106 are carried by a framework 108 comprising four vertically disposed columns 109 rising above the path and arranged in transversely disposed pairs with the upper end of each pair being tied together by channel iron members 110. The columns 109 are further braced by two parallelly disposed beams 111 extending transversely across the path with their opposite ends fixed to the columns intermediate the ends of the latter. The mold parts are mounted on the framework 108 through the medium of an actuating mechanism 112 operable to move the mold parts relative to each other.

In another of its aspects, the invention contemplates a simple, yet efficient, actuating mechanism operable to move the mold parts into pressing engagement with the heated glass sheet and to quickly release the sheet at the completion of the bending process.

To this end, the mold parts 105 and 106 are fixed to one end of arms 113 suspended on the framework 108 with at least one of the arms being swingable about its upper end toward and away from the opposite mold part. The arms 113 are resiliently urged toward one another and means are provided to move the arms away from each other to permit the entry of a heated sheet therebetween.

Figure 10:
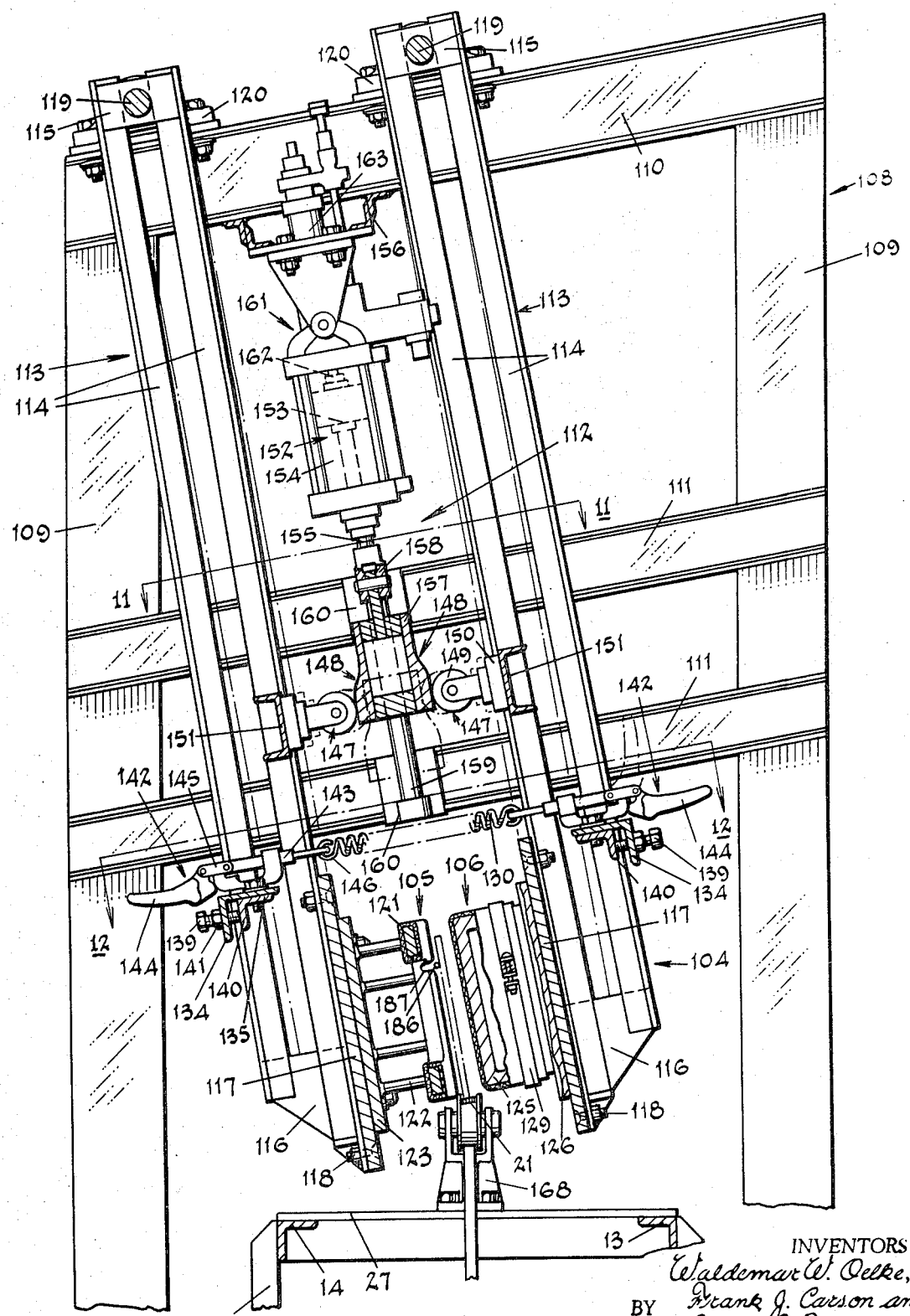
FIG. 10 is a vertical transverse section of the pressing section of the apparatus and taken on line 10—10 of FIG. 2.

As best shown in FIG. 10, each of the arms 113 comprises four rectangularly arranged angles 114 joined at their upper ends by plates 115 and at their lower ends by gusset plates 116 to form a rigid structure. The arms depend from the channel members 110 on opposite sides of the path. A mounting plate 117 supporting a mold part is secured as by bolts 118 to the inner side of the lower end of the arms 113. The arms 113 are disposed in planes parallel to the plane of the sheet as it moves along the path and thus, as shown in FIG. 10, in the present instance, the arms and the plates 117 form an angle of approximately 10° with a vertical plane passing through the path.

In the embodiments illustrated in FIG. 10, both of the arms 113 supporting the mold parts are swingable about parallel, substantially horizontal transversely extending axes to move toward and away from each other to carry the mold parts 105 and 106 into pressing engagement with each other and with the sheet disposed therebetween. For this purpose, the uppermost ends of the arms are fixed to shaft 119 extending through the plates 115 and journaled in bearings 120 carried by the channel members 110.

The shaping surface s 107 are formed on the inwardly directed, opposed faces of the mold parts. The mold part 105 comprises a ring-type pressing element 121, adapted to engage the marginal portions of a glass sheet, supported by posts 122 on a plate 123 bolted to the mounting plate 117 carried by the arm 113 and positioned by locator pins 124 which ensure proper registry between the complemental shaping surfaces.

The other mold part 106 comprises a substantially solid pressing element 125 secured to a plate 126 fixed to the mounting plate. The shaping surface of the mold part 105 is covered by layers of heat-resilient fabric material 127 such as glass cloth or the like wrapped around the metal outline type mold. Similarly, the opposite mold part 106 is provided with a fabric covering 128 secured thereto by a strap 129 extending around the mold.

The arms 113 are resiliently drawn toward one another to move the shaping surfaces 107 into pressing engagement by yieldable means acting between the arms adjacent the plates mounting the mold parts. Herein, the yieldable means comprises coil springs 130 stretched between the arms 113 with the opposite ends of the springs fastened to the arms by attachment means 131 carried thereby. In the present instance, two such springs are utilized extending transversely across the path above the mold.

In order to regulate the initial tension of the springs 130, the attachment means 131 are adjustably mounted on the arms. To this end, each of the attachment means 131 is carried by an L-shaped bracket 132 having one leg 133 extending inwardly toward the mold parts and the other leg 134 extending laterally downwardly therefrom. The leg 133 rests on a parallelly disposed leg 135 of an angle member 136, extending longitudinally along the path and affixed to the arm 113, and is secured thereto by screws 137 projecting downwardly through elongated slots 138 in the leg 133 and threaded into the leg 135 of the angle member 136. An adjustment screw 139 is threaded into the opposite leg 134 to bear against a parallel leg 140 of the angle member 136 whereby upon loosening the locking screws and threading the adjustment screw into or out of the leg 134, the L-shaped bracket 132 is slid toward or away from the path thereby to stretch or relieve the spring 130. A locknut 141 is provided on the adjustment screw 139 to secure the latter in a fixed position when the proper adjustment is attained.

To permit the detachment of the springs 130, thereby to enable free swinging of the arms 113 away from each other to examine, repair or replace the mold parts 105 and 106, the springs are attached to the L-shaped bracket 132 through the medium of quick action type clamps 142 having a barrel portion 143 movable endwise toward and away from the path upon manipulation of a handle 144 attached to the barrel portion by toggle links 145. The innermost end of the barrel portion 143 is apertured to receive looped ends 146 of the springs 130. As shown in FIG. 13, in the present instance, two such springs are utilized and are attached to the arms at their opposite ends through the medium of two similar clamps fixed to the L-shaped member.

The springs 130 urge the mold parts 105 and 106 toward one another and tend to bring the shaping surfaces 107 into pressing engagement. The mold parts are separated by the actuating mechanism 112 operable to cam the arms away from each other. The mechanism 112 includes followers 147 fixed to the arms 113 and projecting inwardly toward each other and riding on cam surfaces 148 which are movable relative to the followers.

The cam surfaces 148, when in a rest position, hold the arms 113 apart with the shaping surfaces 107 positioned at opposite sides of the path so as to permit the passage of the sheet S therebetween. When a sheet is properly positioned between the shaping surfaces, the cam 148 is moved relative to the cam followers 147 permitting the arms 113 to move inwardly under the urging of the springs 130 toward one another thereby to bring the shaping surfaces 107 into pressing engagement with the opposite sides of the heated sheet.

The followers 147 in the present instance comprise rollers 149, each journaled on a bracket 150 secured to a crossbeam 151 extending between the angles 114 of the arms 113 and project inwardly toward one another. The cam surface 148 is disposed between the rollers 149 to hold the arms 113 in a spread position and is movable back and forth along an axis perpendicular to the axis of the rollers toward and away from the path. The cam surfaces 148 are formed so as to permit the arms 113 to be drawn toward one another as the cam is moved in one direction and to force the arm apart against the action of the springs 130 as the cam is moved in the opposite direction.

The cam 148 is shifted back and forth to initiate the bending sequence in timed relationship to the movement of a sheet between the shaping surfaces 107 on the mold parts 105 and 106. For this purpose, the cam 148 is coupled to a linear actuator 152 which moves the cam toward and away from the path.

In the present instance, the actuator 152 comprises a piston 153 slidable back and forth in a hydraulic cylinder 154 with the piston rod 155 coupled to the cam. The cylinder 154 is carried on a mounting bracket 156 extending between and fixed to the channel members 110 of the framework 108 and is disposed along an axis extending perpendicular to the path. The free end of the piston rod 155 is attached to a cam plate 157 which carries the cam 148 through the medium of a clevis 158. The cam surfaces 148 are bolted to opposite ends of the cam plate 157. The movements of the cam plates 157 are guided in a linear path by guide rods 159 disposed on opposite sides of the piston rod 155 and bushed in opposite ends of the cam plate. The rods 159 are carried at their upper and lower ends in blocks 160 bolted to the beams 111 and projecting inwardly toward the plate. As the plate 157 is moved back and forth, the bushings carried thereby slide along the rods 159 and guide the movements of the plate in a straight line.

As shown in FIG. 10, the piston-cylinder actuator is equipped with a control device 161 such as a "Hydrocheck" or the like which regulates the speed at which the piston moves along the cylinder in one or both directions. Devices of this type are well known and usually include a checking piston 162 attached to the head end of the main piston 153 and slidable in a cylinder 163 equipped with suitable valve arrangements to control the rate of the movement of the checking piston relative to the cylinder.

The sheets are carried along the predetermined path through the bending section C and between the opposed shaping surfaces 107 on the mold parts 105 and 106 by the band 21. In operation, the heated sheets are received from the band 20 adjacent the exit end of the heating section B onto the band 21 and are carried thereby to a position between the molds parts 105 and 106, which are in their spaced position, whereupon the band 21 is stopped and the bending sequence initiated. A bending sequence constitutes one back-and-forth movement of the mold parts which moves the mold parts from their spaced position into pressing engagement with the sheets and then separates the mold parts to release the bent sheets. Upon completion of the bending sequence, the operation of the band 21 is resumed and the bent glass sheets are carried away from the mold parts and delivered to the tempering section.

The band 21 also forms an endless loop having a substantially horizontal run defined by the outer periphery of guide sheaves 164 and 165 with the loop being completed by sheaves 166 and 167 disposed below the path and adjacent the exit end of the heating section B in the entry end of the tempering section D respectively.

The sheave 164 is carried by the bracket 26 which also supports the sheave 24 for the band 20. The sheave 165 is carried by a double-bearing bracket 168 disposed adjacent the entry end of the bending section C. To enable adjusting the tension of the band 21, the sheave 166 is carried by a pedestal 169 upstanding from a plate 170 extending transversely across the path and fixed to the side rails 15 and 16 of the frame member 12 and is adjustable relative to the pedestal toward and away from the center of the loop to change the length of the closed loop and thereby to adjust the tension of the band.

One feature of the illustrated apparatus is that the heat imparted to the sheet to raise its temperature to the softening point of glass is utilized in the tempering operation. In other words, the sheets are heated to an elevated temperature, pressed between the shaping surfaces on mold parts and thereafter immediately introduced to the chilling temperature in the tempering section without reheating the sheets. To ensure that the sheets will be at a sufficiently high temperature after bending to facilitate the tempering operation, the band 21 is driven at two speeds. In this manner, the sheets which have been moved through the heating section at a speed facilitating the raising of their temperature to the proper degree are received on the foremost end of the horizontal run of the band 21 which is then being driven at the same speed as the band 20. As the sheets reach a position between the mold parts the band 21 is stopped during the bending sequence and, after bending, the band is driven at an accelerated speed to rapidly move the bent sheets out of the bending section and into the tempering section. The accelerated speed of the band ensures that the loss of temperature of the sheets between the bending section and entrance end of the tempering section is at a minimum.

The band 22, which carries the sheets through the tempering section, is also driven at a speed commensurate with the proper rate of decrease in the temperature of the sheets to produce the desired temper. Herein the tempering section is constructed so that the rate of speed of band 22 is the same as that of band 20 which moves the sheets through the heating section. Thus, as the sheets reach the entrance end of the tempering section, the band 21 is slowed to the constant speed at which the band 22 receives the sheets and conveys them on through the tempering section.

To accomplish the foregoing, the band 21 is driven at variable speeds to move the sheets in the desired manner by a multiple-speed power source 171. The power source 171 includes a motor 172 coupled to an input shaft 173 of a clutch 174, preferably of the electromagnetic type, which shaft is journaled in bearings 175 to rotate about a fixed axis extending transversely of the path. The motor 172 and the bearings 175 are carried by the plate 170. The driving member 177 of the clutch 174 is fast on the shaft 173 intermediate its ends to rotate therewith and is selectively engageable with either of two driven members 178 of the clutch, which members are disposed at opposite sides of the driving members and mounted on the shaft 173 to rotate relative thereto.

Each of the driven members is coupled to a shaft 179 journaled in bearings 180 to rotate about an axis parallel to an axis of the input shaft 173 of the clutch 174 through the medium of suitable drive means such as pulleys 181 fixed to the driven members 178 on the input shaft and to the shaft 179 and belts 182 entrained around the pulleys. As is well known, by selecting the size of the pulleys utilized, the shaft 179 may be rotated at either of two speeds depending upon which of the driven members 178 is engaged with the driving member 177 of the clutch. The shaft 179 is coupled by suitable belt and pulley drive means 183 to the shaft 179' supporting the drive sheave 166. When neither of the driven members 178 of the clutch 174 are engaged with the driving member 177, power to the drive sheave is interrupted and consequently the band 21 is stopped.

Through the use of the signal devices such as a photoelectric cell 184 disposed along a path and activated when a sheet passes thereby, the timed sequence of operation of the band 21 and the bending means 104 is initiated. Thus, when the sheet passes the photoelectric cell 184, the power to the electromagnetic clutch 174 is interrupted, through the medium of conventional time delay circuitry which permits the sheet to move into position between the shaping surfaces 107, to halt movement of the band 21 and to activate the actuating mechanism 112 and thereby initiate the bending sequence. Upon completion of the bending sequence, the clutch 174 is engaged to drive the band 21 at the accelerated speed whereupon the sheet is carried away from the mold parts and past a second photoelectric cell 185 disposed adjacent the path at the exit end of the bending section C, which cell activates a circuit to disengage one of the driven members of the clutch 174 and engage the other driven member to reduce the speed of the band as the sheet enters the tempering section D.

In keeping with the aims of the invention, while passing through the bending section, the sheet is balanced on one edge on the band 21 by a fine wire 186 or cable which engages a very small area of the sheet adjacent the uppermost edge thereof. This support wire 186 extends through the bending section C and across the shaping surface 107 on the mold part 105. When the mold parts 105 and 106 are moved toward one another and into pressing engagement with the opposite surfaces of the glass sheet, the wire 186 is received in a groove 187 formed in the shaping surface 107 of the mold part. When the sheets are supported in a slightly inclined plane, as in the illustrated embodiment, one wire suffices to adequately support the sheet and this wire engages the lowermost surface of the glass sheet. With the illustrated inclined arrangement, the cam surfaces 148 are formed to move the mold part 105 having the groove 187 ahead of the opposite mold part 106 so as to lift, as it were, the sheet off of the support wire 186 before the actual pressing operation.

Further in this respect, as shown in FIG. 10, the cam surfaces 148 may be somewhat similar in configuration permitting both of the arms 113 to move in a similar pattern depending upon the fall $f$ between the widest part $w$ of the cam and the narrowest part $n$. If desired, the cam surfaces 148 may be modified to provide for movement of but one of the arms 113. With this modification, illustrated in FIG. 18, one of the cam surfaces 148' comprises a flat surface 188 whereby the arm 113 carrying the follower 149' riding along this surface remains substantially stationary throughout the bending sequence. The other cam plate 157' has a generated surface 148' operable to support the arm at a first position spaced from the opposite arm and to permit it to be drawn toward the opposite arm during the bending sequence.

TEMPERING SECTION

In the tempering section D, the bent sheets S of glass are moved between chilling means 189 which direct streams of cooling fluid, preferably air, against the sheets to chill the latter and produce the desired temper in the glass. The chilling means 189 include two similarly constructed blast heads 190 disposed on opposite sides of the path and connected to a plenum chamber 191 which in turn is coupled to a source of air under pressure (not shown). The blast heads 190 and the plenum chamber 191 are carried by a frame 192 disposed above the path which may, as in the illustrated embodiment, be suspended from the overhead structure of the building in which the apparatus is housed.

Further in keeping with the aims of the invention, in the chilling section of the apparatus the bent glass sheets are balanced on one edge of the band 22 by cushions of air between their surfaces and the adjacent blast head. By regulating the temperature and velocity of the air moving past the sheet, the rate of cooling may be regulated to produce the desired temper in the glass. To these ends, each of the blast heads 190 comprises a box 193 having a top wall 194, bottom wall 195, sidewalls 196 and a rear wall 197, with the side adjacent the path being closed by a plate 198 disposed in a plane parallel to the plane of the glass sheets and bolted to a flange 199 carried by the top, bottom, and sidewalls of the box. The box 193 and the plate 198 define an enclosed chamber 200 coupled to the plenum chamber 191. As shown in FIG. 16, the means for coupling the chamber 200 to the plenum chamber 191 comprises a flexible fabric tube 201 fixed at one end to the plenum chamber 191 and at its opposite end to a collar 202 surrounding an inlet opening 203 in the top wall 194 of the box 193.

As mentioned above, a blast head is provided at each side of the path to effect opposed air cushions adjacent the opposite sides of the sheet. The air escapes from the chamber 200 of each blast head through apertures in the plate 198 and impinges on the sheet.

The streams of air escaping through the apertures strike the surface of the sheet moving between the plates and flows outwardly from the stream along the surface of the plate. As the air moves along the surface, it absorbs heat and carries it away from the sheet. Thus, it will be appreciated that the efficiency with which the blast heads quench or rapidly reduce the temperature of a sheet depends to some extent upon the ability of the heated air to escape away from the surface of the sheet thereby permitting the relatively cool streams of air, emitting from the apertures, to strike and flow along the surface of the sheets.

To facilitate the escape of the cooling air after it has become heated through contact with the surface of the sheet, in the present instance the apertures through which the air flows comprise a plurality of tubes 204 threaded into the plate 198 at relatively closely spaced intervals and projecting laterally toward the path. The tubes are arranged in a geometric pattern comprising staggered rows so as to provide complete coverage of the sheet surface as the successive portions of the sheet pass adjacent rows. (FIG. 17.)

By way of example, effective tempering has been achieved by utilizing tubes from 4 to 6 inches long and approximately 0.314 to 0.364 inches inside diameter spaced on 0.6 to 1 inch centers in staggered rows as shown in FIG. 17. Since the air may readily escape from the surface of the sheet by flowing between the tubes, effective tempering may be accomplished with the utilization of relatively low blast head pressures. This pressure may be varied depending upon the particular part being processed by the apparatus. It has been found that pressures between 0 to 30 inches of water are usually sufficient to temper sheets intended for use as automobile windows depending upon the size and thickness of the sheets. The air escaping through the tubes 204 and striking the surface of the glass, in effect, performs a double function in that this air absorbs heat from the sheet and carries it outwardly of the sheet to quench the latter and at the same time provides a cushion of air adjacent the opposite surfaces of the sheet to float the sheet between the blast heads as it is moved through the tempering section.

The sheets are moved through the tempering section D on the band 22 which has a horizontal run 205 disposed in aligned relationship with similar runs of the bands 20 and 21.

The band 22 is disposed in the endless loop around guide sheaves 206 and 207, one of which is disposed adjacent the entry end of the tempering section and journaled on the bearing bracket 168 and the other of which is disposed at the exit end of the discharge area. The loop is completed around a drive sheave 208 fixed to a shaft 209 journaled on a bearing 210 mounted on a pedestal 211 upstanding from a plate 212 carried by the side rails 15 and 16 of the lower frame member 12 and an idler sheave 213 journaled on a bracket 214 beneath the guide sheave 206.

The shaft 209 is coupled to the output shaft 215 of a power source 216 including a motor 217 and a suitable speed-reducing unit 218, carried by the plate 212, through the medium of a pulley and a chain belt coupling 219. The power source 216 is similar to the power source 33 driving the band 20 and moves the band at a constant speed around the endless loop. Tension of the band 22 is controlled by shifting the guide sheave 207 toward or away from the center of the loop. To this end, the sheave 207 is carried on adjustable bearing bracket 220.

The band 22 is supported in a horizontal plane by a channel support member 221 carried by a bracket 222 mounted on a transversely extending plate 223 carried by the side rails 13 and 14 of the upper frame member 11. A similar support channel 224 underlies the band 21 adjacent the exit end of the bending section and the entry end of the tempering section.

In accordance with the invention, the means mounting the blast heads 190 on the frame 192 are adjustable to permit the position of the blast heads to be varied relative to the plane in which the sheets are carried thereby to ensure that an air cushion operable to support the sheets will be created, and that the air emerging from the blast heads will adequately cool the sheet in the desired manner. To this end, the means mounting each of the blast heads 190 permit the latter to be shifted back and forth in both a vertical and horizontal plane and, in addition, to be tilted about a substantially horizontal axis.

As is best shown in FIG. 4, the blast heads 190 are attached to hanger plates 224 depending from the frame 192. In order to permit the blast heads to be shifted toward and away from each other in a substantially horizontal plane, the means attaching the blast heads to the lower end of the hanger plates includes studs 225 projecting laterally outwardly from the sides of the blast heads and through slots 226 in the hanger plates, which slots extend transversely of the path. A nut is threaded onto the outer end of each stud 225 and bears against the hanger plate 224 to lock the blast head in the desired position.

The mounting means also includes an angular adjustment device 227 including a block 228 fixed to the sidewalls 196 and projecting laterally outwardly therefrom between opposed adjustment screws 229 threaded into lugs 230 fast on the plate 224 depending from the frame 192. The inner ends of the adjustment screws 229 bear against the block 228 whereby the angular position of the blast head relative to the plane of the glass sheets may be changed by threading the screws into and out of the lugs 230 to tilt the blast heads about the stud 225 as an axis. The adjustment screws 229 are provided with locknuts 231 bearing against the opposite sides of each lug to secure the adjustment screws in any position.

To further lock the box in the desired position, a horizontally disposed threaded rod 232 is secured to the outer surface of the sidewalls 196 by clips 233 and passes through a slot 234 formed in a plate 235 depending from and fixed to the hanger plate 224. Locknuts 236 are threaded on the rod 232 on opposite sides of the plate 235 to bear against the plate and lock the blast head in a fixed position.

The hanger plates 224 are mounted on the frame 192 by bolts 237 extending through vertically disposed slots 238 in the plate 224 and threaded into the frame. The slots 238 permit vertical movement of the hanger plates 224 relative to the frame 192 to adjust the height of the blast heads 190 relative to the path. Raising and lowering of the plates 224 relative to the frame 192 is effected by setscrews 239 threaded into angle plates 240 carried by the end of the hanger plates, which screws bear against the frame 192. By loosening the bolts 237 and threading the setscrews 239 into or out of the angle plate 240, the blast heads 190 may be moved vertically relative to the frame. When at the desired position, the bolts 237 are tightened against the plate 224 to secure the blast head.

Preferably, the blast heads 190 are positioned relative to the path with the outer ends of the tubes 204 lying in parallel planes and spaced apart a distance of approximately 1 inch. Satisfactory results as regards both the creation of the cushion of air and cooling of the sheets have been obtained with this arrangement.

After being tempered, the sheets are moved into and through the discharge area G by the band 22. The sheets are supported on the band in the discharge area by a cushion of air provided by an air flotation unit 241 similar to the unit 42 in the loading area F. The air flotation units in both the loading area and the discharge area are coupled to the supply pipe 96 through valves 242 which control the amount of air flowing against the glass sheet.

As will be apparent, the cushion of air created by the blast heads 190 in the tempering section D and by the air flotation unit 241 in the discharge area G, in normal operation, is sufficient to adequately support the sheet in the desired manner. To ensure that the glass sheets are not forced against either of the blast heads 190 or the surface of the air flotation unit 241 due to a failure of one or both of the blast heads resulting in unequal pressures being created at opposite sides of the sheet or upon failure of the air supply to the flotation unit, wires 243, or cables, similar to the wire 186 supporting the sheet in the bending section C, extending through the tempering section D and the discharge area G, are provided adjacent both the upper and lower edges of the glass sheets and on opposite sides of the glass sheets in the tempering section. One of the wires may be an extension of the wire 186 supporting the glass sheets in the bending section. The wires 243 at one side of the sheet, the lower side in the illustrated embodiment, extend through the tempering section and the discharge area with their ends extending around curved guides 244 and attached to a lug 245 carried by the apparatus, through the medium of a turnbuckle 246, which permits adjustment of the tension of the wires (FIG. 6). A similar arrangement carried by a post 247 mounted on the frame adjacent the entrance end of the discharge area supports the wires adjacent the opposite or upper side of the sheet. Thus, it will be noted that the wires in the tempering section D at the side opposite the air flotation unit do not extend through the discharge area G, thereby facilitating the removal of the sheets from the apparatus.

It will be appreciated that as a safety measure, similar support wires may be extended completely through the apparatus, that is, through the heating section and the loading zone if desired to support the sheets should the means providing the cushions of air malfunction.

As will be apparent, in an apparatus of the above-described character, the sheets are moved substantially continuously through a heating section, a bending section and a tempering section while supported with a minimum of contact between the apparatus and the major surfaces of the sheets thereby insuring that these surfaces will not be scuffed or marred so as to impair clear vision through the sheets. Moreover, in the heating and tempering operations, the sheets are supported and treated through the same medium thereby simplifying the apparatus and further removing any need for contact with the major areas of the sheets.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. A method of bending and tempering glass sheets comprising moving a glass sheet in a substantially vertical orientation along a predetermined path through contiguous heating, bending and chilling areas, directing heated gases against the surfaces of said glass sheets in streams directed substantially perpendicularly against its surfaces and at sufficient pressure to support the sheet in a substantially vertical plane with one edge lying in said path, said gases being at a sufficiently high temperature to heat said sheet to the softening point of the glass whereat the sheet may be shaped to a preselected curvature as the sheet moves through the heating area, moving the heated sheet out of the heating area and into the bending area, supporting the upper margin of the sheet by minimal contact with a thin linear guide extending from said heating area and through said bending area, pressing the heated sheet between complemental shaping surfaces to bend the sheet to a predetermined curvature in said bending area, moving the sheet out of said bending area and into said cooling area while supporting the upper margin thereof by said lineal guide and then directing cooling gases against the surfaces of said sheet in sufficient volume and at sufficient pressure to support the sheet in said plane and to cool the sheet to a temperature below the annealing range of the glass during the movement of the sheet through said bending area.

2. In a method of heattreating a glass sheet wherein said sheet is moved along a substantially horizontal path through contiguous areas of differing temperatures to heattreat the same, the steps of orienting said sheet in a plane offset from the true vertical plane sufficiently to produce a gravitational force in said sheet tending to cause said sheet to fall toward a horizontal position and supporting said oriented sheet on the lower edge thereof for said movement, directing a gas from points spaced throughout the extent of the surface of said sheet toward and substantially perpendicularly to at least one surface of a sheet so oriented and supported as it moves along said path under pressure and regulating said pressure to create a force against said surface sufficient to counterbalance said gravitational force of said sheet and sustain said sheet in said oriented position, and gravity-balancing said oriented and supported sheet on said lower edge and in said substantially vertical plane during movement thereof along said path against said sustaining gas directed toward and substantially perpendicularly to said one surface thereof.

3. A method as defined in claim 2 in which said contiguous areas include heating areas and chilling areas, heated gases are directed in streams toward and substantially perpendicular to the opposite surfaces of said sheet in said heating area to heat the same to at least the bending temperature thereof, cooling gases are directed toward and substantially perpendicularly to the opposite surfaces of said sheet in said chilling area to cool the same to a temperature below the annealing range, the pressure being sufficiently greater against said one surface than against the other surface in said heating and chilling areas to create said force counterbalancing said gravitational force, whereby said sheet is gravity balanced on said lower edge and in said substantially vertical plane in said heating area against said streams of heated gases directed toward and substantially perpendicular to said one surface thereof, and said sheet is gravity balanced on said edge and in said substantially vertical plane in said chilling area against said cooling gases directed toward and substantially perpendicularly to said one surface thereof.

4. A method as defined in claim 2, in which said contiguous areas include a heating area and a bending area beyond said heating area, said sustaining gas directed towards said one surface in said heating area is at a temperature sufficient to heat said glass to bending temperature and said sheet is gravity balanced on said lower edge and in said substantially vertical plane in said heating area against said heated sustaining gas, said sheet is bent to a predetermined curvature in said bending area, and said sheet is gravity balanced on said lower edge and in said substantially vertical plane during movement into and out of bending position in said bending area by supportingly contacting said one surface thereof adjacent its upper edge and only along a line substantially parallel with said path.

5. In a method of heat treating a glass sheet wherein said sheet is moved along a substantially horizontal path through contiguous areas of differing temperatures to heattreat the same, the steps of orienting said sheet in a substantially but not the true vertical plane and supporting said oriented sheet on the lower edge thereof for said movement, directing a gas toward and substantially perpendicularly to at least one surface of a sheet so oriented and supported as it moves along said path under pressure sufficient to sustain said sheet in said oriented position, and gravity-balancing said oriented and supported sheet on said lower edge and in said substantially vertical plane during movement thereof along said path against said sustaining gas directed toward and substantially perpendicularly to said one surface thereof, said contiguous areas including heating areas and chilling areas, heated gases being directed in streams toward and substantially perpendicular to the opposite surfaces of said sheet in said heating area to heat the same to at least the bending temperature thereof, cooling gases being directed toward and substantially perpendicularly to the opposite surfaces of said sheet in said chilling area to cool the same to a temperature below the annealing range, said sheet being gravity balanced on said lower edge and in said substantially vertical plane in said heating area against said streams of heated gases directed toward and substantially perpendicular to said one surface thereof, and said sheet being gravity balanced on said edge and in said substantially vertical plane in said chilling area against said cooling gases directed toward and substantially perpendicularly to said one surface thereof, said contiguous areas also including a bending area between said heating and said chilling areas, said heated sheet being pressed between complemental surfaces in said bending area to bend said sheet to a predetermined curvature, linear guide means being positioned in said bending area to contact said one surface of said sheet adjacent its upper edge along a line substantially parallel with said path when said sheet is in said substantially vertical plane, and said sheet being gravity balanced on said lower edge and in said substantially vertical plane against said contact when out of engagement with said complemental surfaces in said bending area.

6. A method as defined in claim 5 in which said sheet is transferred from said heating area into said bending area while in contact with said linear guide means, is laid back into said contact after being pressed between said complemental surfaces in said bending area, and is transferred from said bending area to said chilling area while in said contact.

7. Apparatus for heattreating a glass sheet while moving the same along a substantially horizontal predetermined path through contiguous areas of differing temperature of heattreat the same, comprising means for supporting said sheet on its lower edge and moving the same through said areas, and heat treating means comprising a panel having a plurality of apertures in at least one of said areas disposed parallel to said path but in a plane inclined upwardly therefrom at an angle less than a 45° angle from the vertical plane to an angle slightly less than the vertical such that a gravitational force normally tends to bias said sheet to fall toward a horizontal position, means for supplying a gas at a predetermined temperature to said apertures to force said gas outwardly from said panel toward a sheet moving therepast under sufficient pressure to exert a force upon said sheet counterbalancing said gravitational force to maintain said sheet in spaced relation to said panel and to balance said sheet on its lower edge on a cushion of said gas between said sheet and said panel.

8. Apparatus as defined in claim 7 in which said contiguous areas include a heating area, heated gases are supplied to said panel in said heating area, the apertures in said heating area panel are arranged in spaced parallel rows extending across said panel in rows inclined upwardly in the direction of the movement of said sheet along said path and with the spacing between adjacent rows increasing progressively upward from the lower edge of said sheet, and said panel also has outwardly opening grooves formed therein between said adjacent rows of apertures and between adjacent apertures in each of said rows to thereby surround each of said apertures.

9. Apparatus as defined in claim 7, in which said contiguous areas include a heating area and a bending area, said gas-supplying means includes means for heating the gas supplied to said panel apertures in said heating area, and said apparatus also includes means within said bending area for bending said sheet to a predetermined curvature and thin elongated guide means extending from said heating area through said bending area and positioned to engage one surface of said sheet along a line adjacent its upper edge when said sheet is in a plane parallel to said upwardly inclined plane of said panel to balance said sheet on its lower edge during movement of said sheet toward and away from said bending means in said bending area.

10. Apparatus for bending and tempering glass sheets, having, in combination, conveyor means adapted to support a glass sheet on its lower edge and carry it along a predetermined substantially horizontal path through contiguous heating, bending, and cooling areas; means defining an enclosed chamber disposed in said heating area adjacent said path and having a planar surface parallel to and upstanding from said path; means supplying heated gases to said chamber under pressure to flow outwardly through said surface toward said path and against a surface of a glass sheet moving along said path thereby creating a cushion of gas between said sheet and said surface to float said sheet in a plane parallel to said planar surface with one edge of said sheet resting on said conveyor; mold parts disposed in said bending area on opposite sides of said path; complemental shaping surfaces formed on opposed faces of said mold parts; means moving said mold parts relative to each other between a first position wherein said mold parts are disposed on opposite sides of said path and a second position wherein said shaping surfaces are in close proximity and in pressing engagement with opposite sides of a glass sheet disposed therebetween; means defining a second enclosed chamber disposed in said cooling area adjacent said path and having a panel parallel to and upstanding from said path, said panel having a plurality of apertures formed therein and communicating with said chamber; means introducing cooling gases under pressure into said chamber to escape outwardly through said apertures and toward said path thereby to create a cushion of gas between said panel and a glass sheet moving thereby to float said sheet in a plane parallel to said panel with one edge resting on said conveyor; and a thin elongated guide element extending from the end of said heating area through said bending area and to said cooling area and operable to engage the upper portion of a glass sheet to receive and balance said sheet on its lower edge on said conveyor as it moves from said heating area into said bending area, as it leaves said mold parts during relative movement thereof from said first to said second position, and as it moves from said bending area into said cooling area.

11. Apparatus for bending and tempering glass sheets, having, in combination, a conveyor operable to move a glass sheet along a predetermined substantially horizontal path through contiguous heating, bending, and cooling areas, means disposed in said heating area for directing heated gases against the surfaces of a glass sheet moving along said path to support said sheet in a substantially vertical plane disposed in said bending area, a lower edge thereof resting on said conveyor, bending means disposed in said bending areas said bending means including a first and second mold parts disposed on opposite sides of said path and having complemental shaping surfaces formed thereon, and means for moving said mold parts toward and away from said path thereby to press said sheet between said shaping surfaces, chilling means for directing streams of cooling gases against the surfaces of said glass sheet to support the sheet in said vertical plane with said lower edge resting on said conveyor as the sheet is carried through said cooling area, and a thin elongated guide element extending from the end of said heating area through said bending area and to said cooling area and operable to engage the upper portion of a glass sheet exiting from said heating area and to balance said sheet on its lower edge on said conveyor during its movement through said bending area and into said cooling area.

12. Apparatus for heat treating a glass sheet while moving the same along a substantially horizontal predetermined path through contiguous areas of differing temperature to heattreat the same, comprising means for supporting said sheet on its lower edge and moving the same through said areas, and heat treating means comprising a panel having a plurality of apertures in at least one of said areas disposed parallel to said path but in a plane inclined upwardly therefrom at an angle less than a 45° angle from the vertical plane, means for supplying a gas at a predetermined temperature to said apertures to force said gas outwardly from said panel toward a sheet moving therepast under sufficient pressure to maintain said sheet in spaced relation to said panel and to balance said sheet on its lower edge on a cushion of said gas between said sheet and said panel, said contiguous areas including a heating area, heated gases being supplied to said panel in said heating area, the apertures in said heating area panel being arranged in spaced parallel rows extending across said panel in rows inclined upwardly in the direction of the movement of said sheet along said path and with the spacing between adjacent rows increasing progressively upward from the lower edge of said sheet, and said panel also having outwardly opening grooves formed therein between said adjacent rows of apertures and between adjacent apertures in each of said rows to thereby surround each of said apertures, and a bending area contiguous to said heating area, means within said bending area for bending said sheet to a predetermined curvature between complemental surfaces, and linear guide means extending from said heating area through said bending area and positioned to engage said sheet along a line adjacent its upper edge when said sheet is out of contact with said surfaces to balance said sheet on said lower edge during movement thereof into and through said bending area and to receive and balance the same as it leaves said bending means.

* * * * *

PO-1050
(5/69)

UNITED STATES PATENT OFFICE
CERTIFICATE OF CORRECTION

Patent No. 3,630,706  Dated  December 28, 1971

Inventor(s) Waldemar W. Oelke et al

It is certified that error appears in the above-identified patent and that said Letters Patent are hereby corrected as shown below:

Col. 2, line 14, "area" (2nd occurrence) should be --areas--

Col. 9, line 51, "ends" should be --sides--; line 52, "plates" should be --plate--

Col. 10, line 1, "molds" should be --mold--

Col. 10, line 33, "temperature" should be --atmosphere--

Col. 16, line 50, "of" (2nd occurrence) should be --to--

Col. 18, lines 5 and 6, cancel "disposed in said bending area," and insert --with--; line 8, cancel "a"

Signed and sealed this 6th day of June 1972.

(SEAL)
Attest:

EDWARD M.FLETCHER,JR.
Attesting Officer

ROBERT GOTTSCHALK
Commissioner of Patents